Patented Dec. 5, 1933

1,937,543

UNITED STATES PATENT OFFICE 1,937,543

METHOD OF MAKING STARCH

Arthur P. Bryant, Clinton, Iowa, assignor to Clinton Corn Syrup Refining Company, Clinton, Iowa, a corporation of Iowa No Drawing. Application January 19, 1931
Serial No. 509,893

3 Claims. (Cl. 127—70)

This invention pertains to the manufacture of various kinds of starch and particularly to the making of a sterile corn starch of unusually soft characteristics.

In the manufacture of commercial corn starch from corn the corn is soaked in a dilute solution of sulphur dioxide containing from .2 to .4% $SO_2$ until the corn is sufficiently soft to permit the removal of the germ, hull and gluten from the starch. During this process the corn suspended in water must be kept from spoiling by maintenance of the sulphur dioxide content at a point which prevents the growth of fungi and other micro-organisms. In the final separation of the gluten from the starch on the starch tables the starch usually receives an additional amount of sulphur dioxide sufficient to maintain approximate sterility during the subsequent washing and dewatering of the starch by means of filter presses or continuous filters. The final dewatered starch containing approximately 45 to 47% moisture is then dried in kilns to remove the surplus moisture.

The starch may be treated in various ways before entering the kilns so as to affect its nature as, for example, render it thinner boiling when cooked up with water than the original starch before treating. The amount of sulphur dioxide required to maintain approximate sterility sometimes causes the starch to become hard during the drying process, while too little sulphur dioxide may permit the growth of molds which may make the starch musty and sometimes cause it to be so hard that it does not mix up with water readily to form a smooth starch milk.

The pure food laws do not permit the presence of sulphur dioxide in finished food materials to an extent greater than the faintest trace. Ordinarily, commercial corn starch will contain around 15 to 20 parts per million of sulphur dioxide. If this percentage could be reduced it would be a distinct advantage.

I have found that the sulphur dioxide can be removed readily by the addition of a definite amount of sodium hypochlorite sufficient to oxidize the sulphur dioxide. The free alkali in the sodium hypochlorite neutralizes the sulphuric acid thus formed producing sodium sulphate which is removed by washing. If a slight excess of chlorine is added in this way the starch becomes practically sterile or at least the micro-organisms are so devitalized that there is little or no danger of the growth of molds in the starch during the drying process. At the same time an excess of chlorine must be avoided or it may affect detrimentally the taste of the finished product.

In carrying out the process the sulphur dioxide content of the starch milk before the final dewatering process is carefully determined and sufficient sodium hypochlorite added to oxidize this sulphur dioxide with a very slight excess of available chlorine contained in the sodium hypochlorite which is added. The sodium hypochlorite may be of any convenient strength but I prefer a solution containing from 6 to 7% available chlorine and about 2% free alkali as caustic soda.

The starch milk after treatment according to the above method is usually allowed to stand in tubs with agitation to prevent settling out of the starch for a period of time ranging from 4 to 6 hours after which it is dewatered and thoroughly washed in the usual manner and then is ready for the kilns.

An important result is obtained by the action of the sodium hypochlorite on the starch in that it is rendered more thick boiling than ordinary corn starch. In other words, a given amount of starch mixed and cooked with a given amount of water will produce a thicker paste or "gel" where the starch has been treated with the sodium hypochlorite than where it has not. This makes the starch of especial value in the manufacture of certain food products such as bakery products, for example, and in some commercial uses as for example in certain textile sizings.

The results attained by the use of sodium hypochlorite are therefore four-fold. The viscosity of the starch paste is increased; the starch is rendered more nearly sterile, the micro-organisms being devitalized; also sulphur dioxide is removed rendering the starch absolutely free from this compound; and finally the finished starch is softer to the feel and mixes so easily with water that it forms a smoother paste than does ordinary starch and with less danger of the formation of small lumps of hard semi-cooked starch when the starch is used for starch paste, in textile sizings, or in food products.

The acidity of finished starch under ordinary commercial procedures usually ranges from .08 to .12% figured as hydrochloric acid, whereas with the improved process this acidity can be brought to approximately half this amount or even to exact neutrality. If the amount of free alkali in the sodium hypochlorite does not suffice at all times to reduce the acidity to the low point desired free caustic soda in dilute solution is added to reduce the acidity.

It should be understood that this invention contemplates in addition various modifications of the process described above, and the use of other than sodium hypochlorite, such for example as potassium or calcium hypochlorite, all within the scope of the invention claimed hereinafter.

Having described my invention, I claim:

1. A process of making a thicker boiling starch without decreasing the amount of sulphur dioxide normally added to the starch milk comprising treating starch milk which contains the normal amounts of sulphur dioxide with sodium hypochlorite solution in quantity sufficient to remove all of the sulphur dioxide and render the starch softer, more sterile and better adapted for production of a thicker boiling starch than if the hypochlorite were omitted, and thereafter dewatering, washing and drying the starch.

2. In the manufacture of starch, the steps of adding sodium hypochlorite solution to a starch milk which contains sufficient sulphur dioxide to render and keep it sterile until the completion of the starch manufacture, the quantity of sodium hypochlorite being sufficient to oxidize all of the sulphur dioxide and also containing adequate available chlorine for maintaining the sterility of the starch, for improving the softness and thick boiling characteristics of the starch, and thereafter dewatering, washing and drying the starch.

3. In the manufacture of starch, the improvement which consists in adding to starch milk sterilized by sulphur dioxide a hypochlorite solution in amount sufficient to remove the sulphur dioxide by oxidation and improve the softness and thick boiling characteristics of the subsequently finished starch, without adding such an excess as would harmfully affect the taste of the finished starch or leave in the starch any appreciable residue of chlorine.

ARTHUR P. BRYANT.